(12) United States Patent
Luo

(10) Patent No.: US 10,145,543 B1
(45) Date of Patent: Dec. 4, 2018

(54) DEVICE FOR ADJUSTING HEIGHT OF SUSPENDED LAMP

(71) Applicant: Sinowell (Shanghai) Co., Ltd., Shanghai (CN)

(72) Inventor: Jia Luo, Shanghai (CN)

(73) Assignee: Sinowell (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 15/923,012

(22) Filed: Mar. 16, 2018

Related U.S. Application Data

(63) Continuation of application No. PCT/CN2017/115394, filed on Dec. 11, 2017.

(30) Foreign Application Priority Data

Aug. 31, 2017 (CN) .......................... 2017 1 0769064

(51) Int. Cl.
*F21V 21/18* (2006.01)
*F16M 13/02* (2006.01)
*A01G 7/04* (2006.01)

(52) U.S. Cl.
CPC ........... *F21V 21/18* (2013.01); *F16M 13/022* (2013.01); *F16M 13/027* (2013.01); *A01G 7/045* (2013.01); *F16M 2200/028* (2013.01)

(58) Field of Classification Search
CPC ........ F21V 21/008; F21V 21/16; F21V 21/18; F21V 21/36; F21S 8/061
See application file for complete search history.

(56) References Cited

U.S. PATENT DOCUMENTS

| | | | | | |
|---|---|---|---|---|---|
| 1,599,219 | A | * | 9/1926 | Dowick | F21V 21/18 191/12.2 R |
| 3,637,159 | A | * | 1/1972 | Caramella | F21V 21/18 242/379.2 |
| 4,300,732 | A | * | 11/1981 | Gaeta | F21V 21/18 242/379.2 |
| 4,381,539 | A | * | 4/1983 | Sakurai | F21V 21/18 362/285 |
| 4,556,184 | A | * | 12/1985 | O'Sullivan | F21V 21/18 242/382 |
| 5,065,971 | A | * | 11/1991 | Gaube | A47G 7/047 248/321 |
| 5,261,645 | A | * | 11/1993 | Huffman | E04B 9/003 248/277.1 |

(Continued)

FOREIGN PATENT DOCUMENTS

CN 104334967 A 2/2015

*Primary Examiner* — Bradley Duckworth
(74) *Attorney, Agent, or Firm* — Alston & Bird LLP

(57) ABSTRACT

Disclosed is a device for adjusting the height of a suspended lamp, which includes at least a guide roller combination, an operating cord, a limiting member, a controlling member and an adjusting shell, the adjusting shell being connected to the lamp, and the guide roller combination and the limiting member being arranged in the adjusting shell, a circumferential end surface of the guide roller combination includes an inwardly recessive roller groove in a radial direction thereof, the operating cord is arranged within the roller groove, one end of the operating cord exits through the adjusting shell and is fixed at an upper end in a lamp moving area range, the other end of the operating cord exits through the adjusting shell to become a free end.

9 Claims, 4 Drawing Sheets

(56) References Cited

U.S. PATENT DOCUMENTS

| | | | | |
|---|---|---|---|---|
| 5,582,378 | A * | 12/1996 | Fusi | F16M 11/38 |
| | | | | 242/381 |
| 7,033,048 | B2 * | 4/2006 | Sin | F21V 21/36 |
| | | | | 362/286 |
| 7,153,001 | B2 * | 12/2006 | Kim | F21V 21/15 |
| | | | | 362/291 |
| 7,530,519 | B2 * | 5/2009 | McDuff | A47G 7/047 |
| | | | | 242/385.4 |
| 8,245,441 | B1 * | 8/2012 | Domek | A01G 9/024 |
| | | | | 242/130.2 |
| 9,815,670 | B2 * | 11/2017 | Bauder | B66D 1/46 |
| 9,927,105 | B2 * | 3/2018 | Brown | F21V 21/16 |
| 2008/0074893 | A1 * | 3/2008 | Ham | F21V 21/16 |
| | | | | 362/387 |
| 2014/0369061 | A1 * | 12/2014 | Kim | F21S 2/00 |
| | | | | 362/543 |
| 2017/0009937 | A1 * | 1/2017 | Shin | F16M 13/027 |
| 2017/0023218 | A1 * | 1/2017 | Brown | F21V 21/16 |

\* cited by examiner

DEVICE FOR ADJUSTING HEIGHT OF SUSPENDED LAMP

CROSS-REFERENCE TO RELATED APPLICATION

The present invention claims priority to and benefit of Chinese Patent Application No. 201710769064.1, filed with the State Intellectual Property Office (SIPO) of the People's Republic of China on Aug. 31, 2017, the entire content of which is incorporated by reference into the present application. The present application is also a continuation of PCT/CN2017/115394, filed on Dec. 11, 2017, the entire content of which is incorporated by reference into the present application.

TECHNICAL FIELD

The present invention relates to the field of lighting equipment application, and more specifically relates to a device for adjusting the height of a suspended lamp.

BACKGROUND ART

In some lighting environments, such as in the application of light supplementing lamp for plants, the light supplementing lamp is usually suspended above the plant and remains a fixed distance from the plant. In this case, if the distance is too short, the plant may be burned by the light, while if the distance is too long, the loss of light increases, and accordingly the plant may not receive sufficient light. In this regard, with plant growth, the suspension height of the light supplementing lamp frequently needs to be adjusted higher. Moreover, when a season of crop growth or a growth cycle of the plant is over, the light supplementing lamp needs to be re-adjusted down to its initial height when new crop or plant growth begins. At present, the light supplementing lamps available on the market are all the lamps fixedly suspended on indoor ceilings, which cannot be easily adjusted corresponding to plant height, which may result in wasting a lot of resources. Therefore, how to achieve a simple adjustment on the height of a suspended lamp becomes a problem to be solved.

The patent document CN104334967A discloses a device for suspending and adjusting the height of a lamp. Although the device is able to increase the height of the lamp by way of pulling a cord to drive a limiting member to rotate, it is unable to drive the limiting member to rotate reversely so as to reduce the height of the lamp. Thus, this device is very inconvenient in actual use. In light of the foregoing, in order to easily adjust the height of a suspended lamp, a control member needs to be created to act on the limiting member, such that the limiting member can be driven to rotate reversely to reduce the height of the suspended lamp.

SUMMARY OF INVENTION

One object of the present invention is to provide a device for adjusting the height of a suspended lamp, so as to solve the technical problem in the prior art that the height of a suspended lamp cannot be easily adjusted and at the same time, it is also able to solve the technical problem in the prior art that the energy consumption of the lamp is very high, and sometimes cannot provide sufficiently supplementing light to plants.

The present invention adopts the following technical solutions to solve the technical problems: a device for adjusting the height of a suspended lamp, including a guide roller combination, an operating cord, a limiting member, and an adjusting shell, the adjusting shell being connected to the lamp, and the guide roller combination and the limiting member being arranged in the adjusting shell, a circumferential end surface of the guide roller combination includes an inwardly recessive roller groove in a radial direction thereof, the operating cord is arranged within the roller groove, one end of the operating cord exits through the adjusting shell and is fixed at an upper end in a lamp moving area range, the other end of the operating cord exits through the adjusting shell to become a free end, the limiting member acts on the guide roller combination to limit the rotation direction of the guide roller combination.

Preferably, the device further includes a controlling member, and the controlling member acts on the limiting member to stop the limiting member from limiting the guide roller combination.

Preferably, the limiting member includes a first ratchet, and a second ratchet, where the first ratchet is fixed in the adjusting shell, the second ratchet is arranged on the guide roller combination, the first ratchet and the second ratchet engage with each other, and the first ratchet restricts the rotation direction of the second ratchet.

Preferably, one end surface on one end of the guide roller combination is provided with a first ring groove, the second ratchet is engaged in the first ring groove to be configured coaxial with the guide roller combination, an inner wall of the adjusting shell is provided with a plurality of ratchet teeth arranged in a circular array, the plurality of ratchet teeth constitutes the first ratchet, the inner wall of the adjusting shell on a radial periphery of the plurality of ratchet teeth extends outwards to form a first receiving cavity, the first ring groove on one end of the guide roller combination extends into the first receiving cavity, and the second ratchet is engaged with the plurality of ratchet teeth.

Preferably, the controlling member includes a controlling disk, a controlling block, and a controlling spring, one end of the controlling block is fixed on an end surface of the controlling disk, a second ring groove is provided in an inward radial direction on a center of the end surface of the second ratchet engaging the first ratchet, the controlling disk is arranged with the second ring groove, the adjusting shell is provided with an operating opening in communication with the first receiving cavity, the other end of the controlling block passes through the first receiving cavity and then exits the operating opening, one end of the controlling spring abuts against an inner wall of the first ring groove, and the other end of the controlling spring abuts against one end surface of the second ratchet in a proximity of the first ring groove.

Preferably, the guide roller combination includes a first guide roller and a second guide roller, the first guide roller and the second guide roller are coaxially arranged, the first guide roller is provided with a plurality of first guide ribs on one end surface in a proximity of the second guide roller, the plurality of first guide ribs is arranged in a circular array with a center of one end surface of the first guide roller as a center thereof, the second guide roller is provided with a plurality of second guide ribs on one end surface in a proximity of the first guide roller, the plurality of second guide ribs is arranged in a circular array with a center of one end surface of the first guide roller as a center thereof, and a gap between the first guide ribs and the second guide ribs forms the roller groove.

Preferably, the device further includes a first hook and a second hook, one end of the operating cord is arranged in a hooked fixation with the first hook, and the adjusting shell is connected to the lamp via the second hook.

Preferably, the adjusting shell includes a lower opening and an upper opening, lower opening is arranged on a lower end of the adjusting shell, tow ends of the operating cord pass through the lower opening, the upper opening is arranged on an upper end of the adjusting shell, and the second hook is arranged at the upper opening.

Preferably, the adjusting shell includes a first sub-shell, a second sub-shell, and a connecting shaft, the first sub-shell covers the second sub-shell, a gap is formed between an upper portion of the first sub-shell and an upper portion of the second sub-shell, the gap forms the upper opening, the connecting shaft passes through the upper opening between the first sub-shell and the second sub-shell, and the second hook is hooked on the connecting shaft.

Compared with the prior art, the present invention has the following advantages: the present invention is provide with an operating cord and a guide roller combination, the operating cord is arranged within the roller groove, one end of the operating cord is fixed at an upper end in a lamp moving area range, when the free end of the operating cord is pulled, the guide rollers are driven to rotate, such that the guide rollers drive the adjusting shell as a whole to move towards the fixed end of the operating cord, in addition, the adjusting shell is connected to the lamp, accordingly the lamp will be driven to move towards an upper end of the operating cord. In this way, the height of the lamp can be easily adjusted any time during plant growth, such that the energy consumption can be reduced, the resources can be saved, and the plant can receive better supplementing light.

Figure 1:
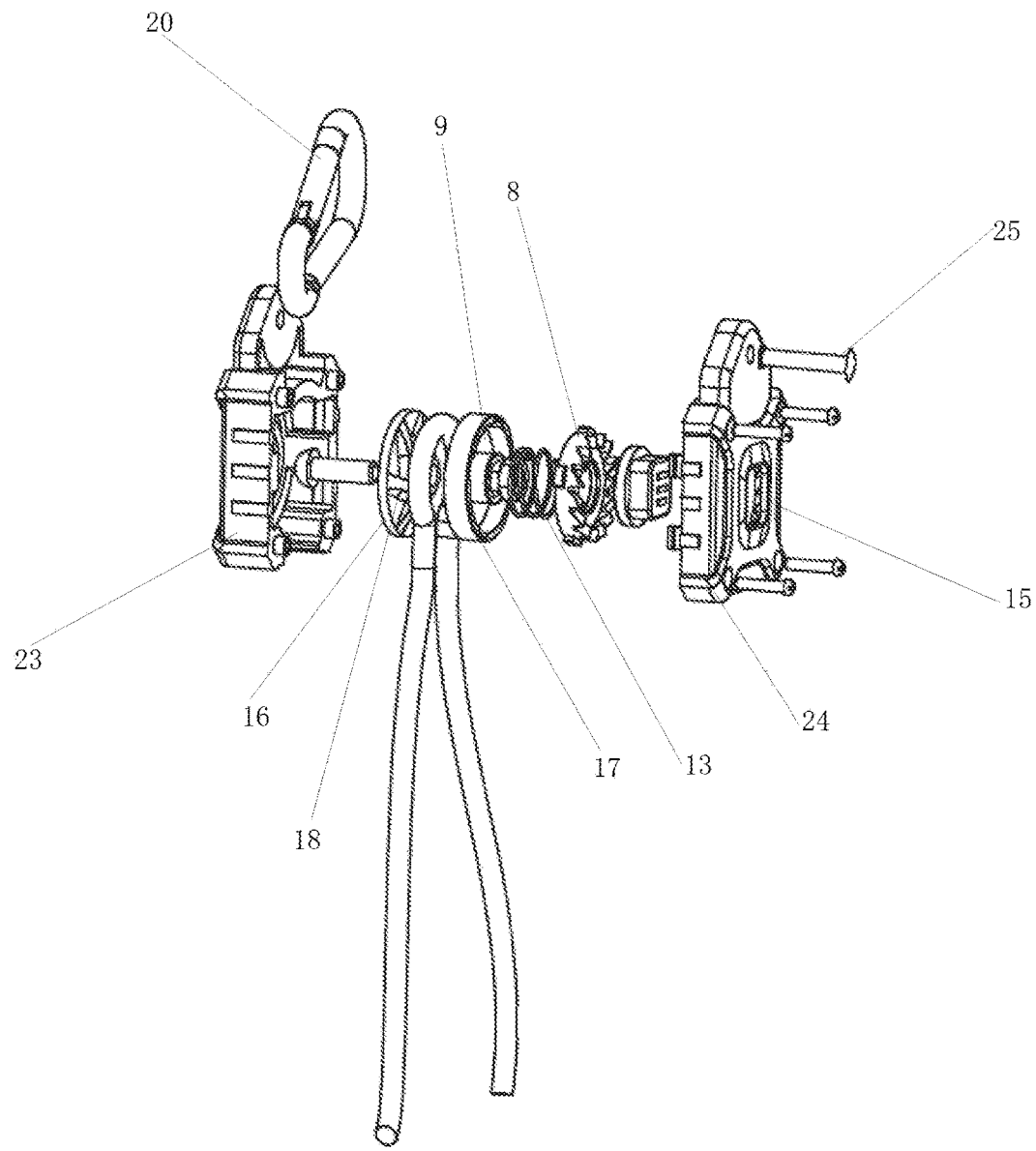
FIG. 1 is an exploded schematic view of the device for adjusting the height of a suspended lamp.
Figure 2:
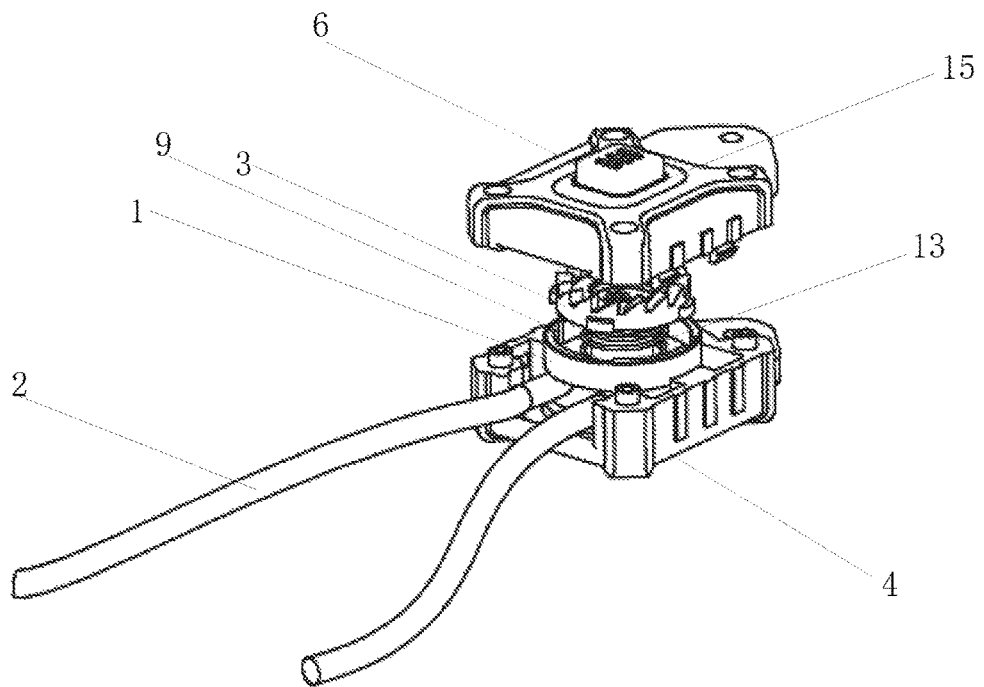
FIG. 2 is a partial exploded schematic view of the device for adjusting the height of a suspended lamp without the second hook.
Figure 3:
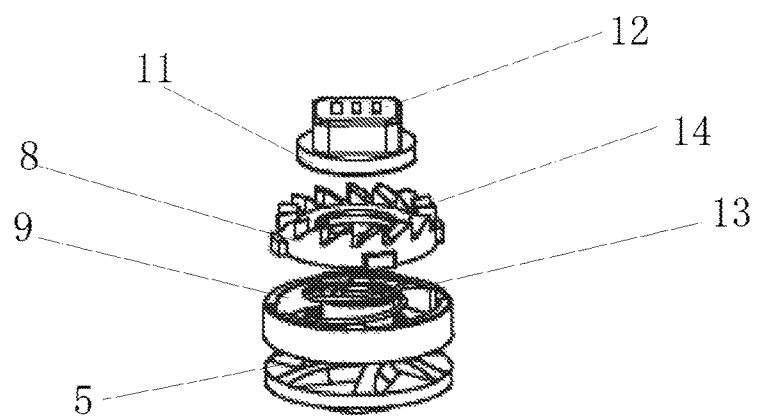
FIG. 3 is an exploded schematic view of the connections of the guide roller combination with the second ratchet and the controlling member.
Figure 4:
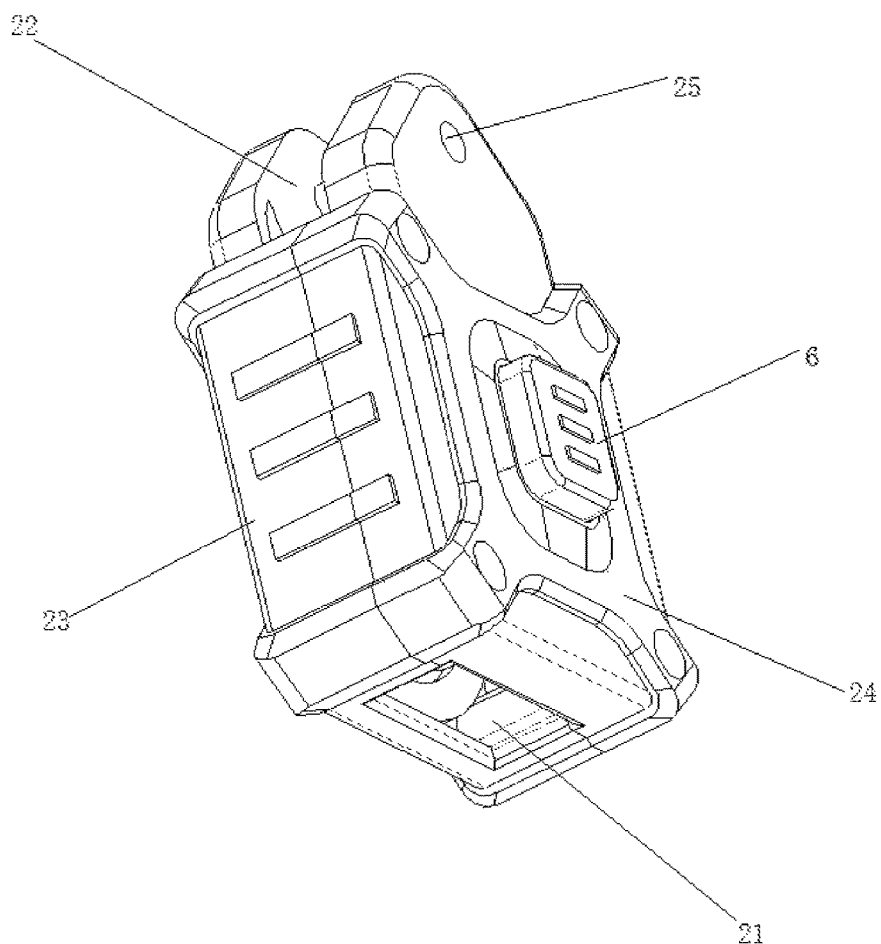
FIG. 4 is a schematic view of the structure of the device for adjusting the height of a suspended lamp without the operating cord.
Figure 5:
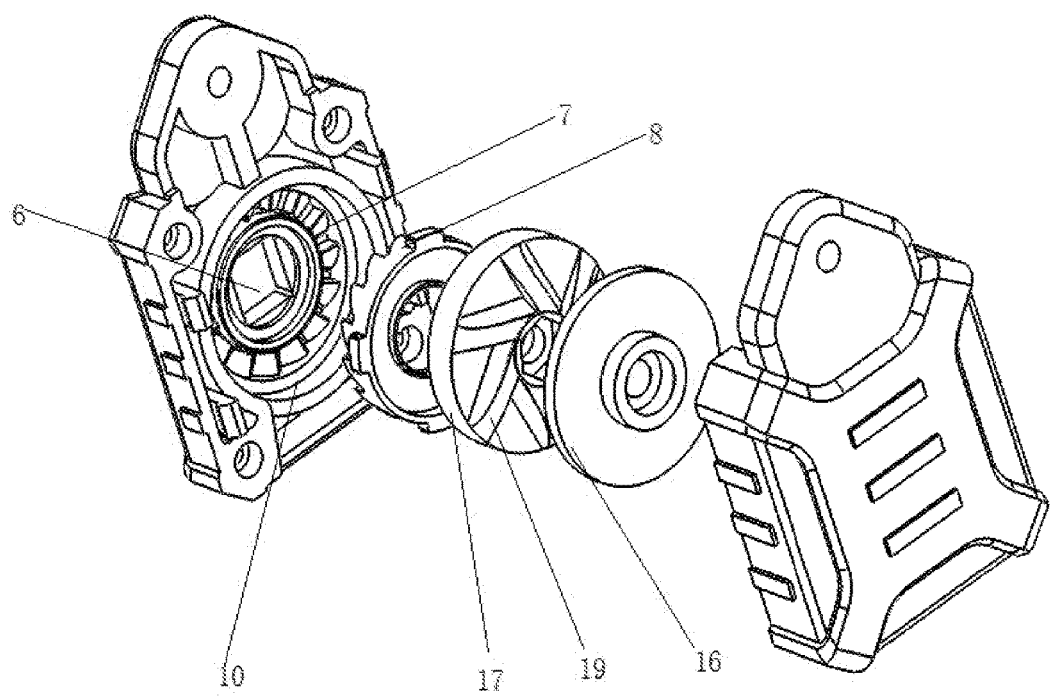
FIG. 5 is an exploded schematic view of the device for adjusting the height of a suspended lamp without the operating cord.

In the element reference numbers shown in the figures: 1—guide roller combination, 2—operating cord, 3—limiting member, 4—adjusting shell, 5—roller groove, 6—controlling member, 7—first ratchet, 8—second ratchet, 9—first ring groove, 10—first receiving cavity, 11—controlling disk, 12—controlling block, 13—controlling spring, 14—second ring groove, 15—operating opening, 16—first guide roller, 17—second guide roller, 18—first guide rib, 19—second guide rib, 20—second hook, 21—lower opening, 22—upper opening, 23—first sub-shell, 24—second sub-shell, 25—connecting shaft

DESCRIPTION OF EMBODIMENTS

The present invention will be further described in detail below. It should be understood that the specific embodiments described herein are merely used to explain the present invention, and are not intended to limit the present invention.

Example 1

This example provided a device for adjusting the height of a suspended lamp, which includes a guide roller combination 1, an operating cord 2, a limiting member 3, and an adjusting shell 4, the adjusting shell is connected to the lamp, and the guide roller combination 1 and the limiting member 3 are arranged in the adjusting shell 4, a circumferential end surface of the guide roller combination 1 includes an inwardly recessive roller groove 5 in a radial direction thereof, the operating cord 2 is arranged within the roller groove 5, one end of the operating cord 2 exits through the adjusting shell 4 and is fixed at an upper end in a lamp moving area range, the other end of the operating cord 2 exits through the adjusting shell 4 to become a free end, the limiting member 3 acts on the guide roller combination 1 to limit the rotation direction of the guide roller combination 1.

The circumferential end surface of the guide roller combination 1 is provided with an inwardly recessive roller groove 5 in a radial direction thereof, and the roller groove 5 provides a moving space for the operating cord 2 when being pulled. In addition, one end of the operating cord 2 is fixed at an upper end in a lamp moving area range, the other end of the operating cord 2 exits through the adjusting shell 4 to become a free end. In this way, when the free end is pulled, the guide roller combination 1 is driven to rotate, and at the same time, the location where the operating cord 2 is in contact with the guide roller combination 1 changes correspondingly, the guide roller combination 1 rotates, which further drives this adjusting device to move towards the fixed end of the operating cord 2. In the whole operating process, the operating cord 2 not only provides driving force to the guide roller combination 1, but also provides a moving guide for the guide roller combination 1 to drive the adjusting device. Of course, the lamp may be provided with a separate suspended movement rail; and this movement rail would be corresponding to the moving passage of the adjusting device, and in this case, the adjusting shell provides driving force via the operating cord 2. The fixed end of the operating cord 2 is in a high position. As a result, the lamp connected to the adjusting shell 4 will move upwards when the operating cord 2 is pulled, such that the height of the lamp can be adjusted according to actual needs. In addition, a limiting member 3 is provided, and the limiting member 3 controls the guide roller combination 1 to move in one direction only. That is, such configuration only allows the rotation direction to be the rotation direction that drives the adjusting device to move towards the upper end. As a result, when the lamp is positioned at a certain height, as long as the free end of the operating cord 2 is not pulled to drive the lamp move upwards, the limiting member is able to limit or stop the guide roller combination 1 from rotating reversely; accordingly, the lamp will not fall back to a lower position. For plants or crops that need continuous supplementing light, the height of the lamp can be easily adjusted according to the height of the plants to adapt to the growth of the plants with less energy consumption, less waste of resources and better supplementing light.

In a preferred further embodiment of this example, the device for adjusting the height of a suspended lamp further includes a controlling member 6, and the controlling member 6 acts on the limiting member 3 to stop the limiting member from limiting the guide roller combination 1. That is to say, the guide roller combination 1 is released from the control of the limiting member 3. With the growth of plants or crops, once a growing season is over, a new season of crops or plants need to be started, and in this case, the height of the lamp needs to be re-adjusted to meet the needs of new crops or plants. By way of the controlling member 6, the guide roller combination 1 is released from the control of the limiting member 3, such that the adjusting shell 4 in communication with the guide roller combination 1 drives the lamp to move downwards, and when the lamp falls to a suitable height, the controlling member does not control the guide roller combination 1 anymore, and accordingly the rotation direction of the guide roller combination 1 is limited by the limiting member 3 again.

In this example, a preferred simple and effective embodiment is further provided for the limiting member 3. The limiting member 3 includes a first ratchet 7, and a second ratchet 8, where the first ratchet 7 is fixed in the adjusting shell 4, the second ratchet 8 is arranged on the guide roller combination 1, the first ratchet 7 and the second ratchet 8 engage with each other, and the first ratchet 7 restricts the rotation direction of the second ratchet 8. The foregoing configuration is simple and effective. The first ratchet 7 and the second ratchet 8 engage with each other, such that the second ratchet 8 is only allowed to rotate in one direction, accordingly, the guide roller combination 1 is only allowed to rotate in one direction.

A configuration of the first ratchet 7 and the second ratchet 8 is further provided in the present invention. One end surface on one end of the guide roller combination 1 is provided with a first ring groove 9, the second ratchet 8 is engaged in the first ring groove 9 to be configured coaxial with the guide roller combination 1, an inner wall of the adjusting shell 4 is provided with a plurality of ratchet teeth arranged in a circular array, the plurality of ratchet teeth constitutes the first ratchet 7, the inner wall of the adjusting shell 4 on a radial periphery of the plurality of ratchet teeth extends outwards to form a first receiving cavity 10, the first ring groove 9 on one end of the guide roller combination 1 extends into the first receiving cavity 10, and the second ratchet 8 is engaged with the plurality of ratchet teeth. In this way, when the first ratchet 7 and the second ratchet 8 rotate in an engaging way, the first ring groove 9 and the first receiving cavity 10 provide a stable rotation space for the first ratchet 7 and the second ratchet 8 respectively, which makes the operation more stable.

A configuration of the controlling member 6 is further provided in one preferred embodiment of the present invention. The controlling member 6 includes a controlling disk 11, a controlling block 12, and a controlling spring 13, one end of the controlling block 12 is fixed on an end surface of the controlling disk 11, a second ring groove 14 is provided in an inward radial direction on a center of the end surface of the second ratchet 8 engaging the first ratchet 7, the controlling disk 11 is arranged with the second ring groove 14, the adjusting shell 4 is provided with an operating opening 15 in communication with the first receiving cavity 10, the other end of the controlling block 12 passes through the first receiving cavity 10 and then exits the operating opening 15, one end of the controlling spring 13 abuts against an inner wall of the first ring groove 9, and the other end of the controlling spring 13 abuts against one end surface of the second ratchet 8 in a proximity of the first ring groove 9. In this way, when the controlling member 6 is needed to control the limiting member 3, the controlling block 12 is pushed down towards an interior of the adjusting shell 4, the controlling spring 13 is pressed down so as to drive the second ratchet 8 to move towards an interior of the first ring groove 9, such that the second ratchet 8 is disengaged from the first ratchet 7; as a result, the rotation of the second ratchet 8 is not restricted by the first ratchet 7 anymore, accordingly, the rotation direction of the guide roller combination 1 connected to the second ratchet 8 is not restricted anymore. At this moment, the adjusting device can be moved to a lower position, and when the lamp is moved to a suitable position, the controlling block 12 is released; as a result, the controlling spring 13 pushes the second ratchet 8 back to its original position to be engaged with the first ratchet 7, such that the guide roller combination 1 is restricted again.

A configuration of the guide roller combination 1 is further provided in one preferred embodiment of the present invention. The guide roller combination 1 includes a first guide roller 16 and a second guide roller 17, the first guide roller 16 and the second guide roller 17 are coaxially arranged, the first guide roller 16 is provided with a plurality of first guide ribs 18 on one end surface in a proximity of the second guide roller 17, the plurality of first guide ribs 18 is arranged in a circular array with a center of one end surface of the first guide roller 16 as a center thereof, the second guide roller 17 is provided with a plurality of second guide ribs 19 on one end surface in a proximity of the first guide roller 16, the plurality of second guide ribs 19 is arranged in a circular array with a center of one end surface of the first guide roller 16 as a center thereof, and a gap between the first guide ribs 18 and the second guide ribs 19 forms the roller groove 5. The operating cord 2 is arranged within the roller groove 5; the first guide ribs 18 and the second guide ribs 19 are able to enhance the stability of the operating cord 2 when it is being pulled.

In a preferred embodiment of this example, the device further includes a first hook (not shown) and a second hook 20, one end of the operating cord 2 is arranged in a hooked fixation with the first hook, and the adjusting shell 4 is connected to the lamp via the second hook 20. The first hook is able to facilitate changing the height of the fixed end of the operating cord 2, so as to meet different requirements for plant growth. In addition, when it is necessary, the lamp can be easily replaced through the second hook 20.

In a preferred embodiment of this example, the adjusting shell 4 includes a lower opening 21 and an upper opening 22, lower opening 21 is arranged on a lower end of the adjusting shell 4, two ends of the operating cord 2 pass through the lower opening 21, the upper opening 22 is arranged on an upper end of the adjusting shell 4, and the second hook 20 is arranged at the upper opening 22. Moreover, the adjusting shell 4 includes a first sub-shell 23, a second sub-shell 24, and a connecting shaft 25, the first sub-shell 23 covers the second sub-shell 24, a gap is formed between an upper portion of the first sub-shell 23 and an upper portion of the second sub-shell 24, the gap forms the upper opening 22, the connecting shaft 25 passes through the upper opening between the first sub-shell 23 and the second sub-shell 24, and the second hook 20 is hooked on the connecting shaft 25. The split configuration of the first sub-shell 23 and the second sub-shell 24 can facilitate the production of the product according to the present invention, and allow easy formation of the upper opening 22 and the lower opening 21.

The order of the above embodiments is merely for convenience of description and does not represent the advantages and disadvantages of the respective embodiments.

Finally, it should be noted that the foregoing embodiments are merely intended for describing the technical solutions of the present invention, but not for limiting the present invention. Although the present invention is described in detail with reference to the foregoing embodiments, it should be understood by those skilled in the art that certain modifications can be made to the technical solutions described in the foregoing embodiments or equivalent replacements can be made to certain technical features in the technical solutions. These modifications or replacements do not make the essence of the corresponding technical solutions depart from the spirit and scope of the present invention.

What is claimed is:

1. A device for adjusting a height of a suspended lamp, comprising a guide roller combination, an operating cord, a limiting member, a controlling member, and an adjusting shell, the adjusting shell being connected to the suspended lamp, and the guide roller combination and the limiting member being arranged in the adjusting shell, wherein a circumferential end surface of the guide roller combination comprises an inwardly recessive roller groove in a radial direction, wherein the operating cord is arranged within the inwardly recessive roller groove, wherein the limiting member acts on the guide roller combination to limit a rotation direction of the guide roller combination, and the controlling member acts on the limiting member to stop the limiting member from limiting the guide roller combination, and wherein one end surface on one end of the guide roller combination is provided with a first ring groove, wherein a second ratchet is engaged in the first ring groove and configured coaxial with the guide roller combination, wherein an inner wall of the adjusting shell is provided with a plurality of ratchet teeth arranged in a circular array, wherein the plurality of ratchet teeth constitutes a first ratchet, wherein the inner wall of the adjusting shell on a radial periphery of the plurality of ratchet teeth extends outwards to form a first receiving cavity, wherein the first ring groove on one end of the guide roller combination extends into the first receiving cavity, and the second ratchet is engaged with the plurality of ratchet teeth.

2. The device for adjusting the height of a suspended lamp according to claim 1, wherein the limiting member comprises the first ratchet and the second ratchet, wherein the first ratchet is fixed in the adjusting shell, wherein the second ratchet is arranged on the guide roller combination, wherein the first ratchet and the second ratchet engage with each other, and the first ratchet restricts a rotation direction of the second ratchet.

3. The device for adjusting the height of a suspended lamp according to claim 2, wherein the controlling member comprises a controlling disk, a controlling block, and a controlling spring, wherein one end of the controlling block is fixed on an end surface of the controlling disk, wherein a second ring groove is provided in an inward radial direction on a center of an end surface of the second ratchet engaging the first ratchet, wherein the controlling disk is arranged with the second ring groove, wherein the adjusting shell is provided with an operating opening in communication with the first receiving cavity, wherein the other end of the controlling block passes through the first receiving cavity and exits the operating opening, wherein one end of the controlling spring abuts against an inner wall of the first ring groove, and the other end of the controlling spring abuts against one end surface of the second ratchet in a proximity of the first ring groove.

4. The device for adjusting the height of a suspended lamp according to claim 1, wherein the controlling member comprises a controlling disk, a controlling block, and a controlling spring, wherein one end of the controlling block is fixed on an end surface of the controlling disk, wherein a second ring groove is provided in an inward radial direction on a center of an end surface of the second ratchet engaging the first ratchet, wherein the controlling disk is arranged with the second ring groove, wherein the adjusting shell is provided with an operating opening in communication with the first receiving cavity, wherein the other end of the controlling block passes through the first receiving cavity and exits the operating opening, wherein one end of the controlling spring abuts against an inner wall of the first ring groove, and the other end of the controlling spring abuts against one end surface of the second ratchet in a proximity of the first ring groove.

5. The device for adjusting the height of a suspended lamp according to claim 1, wherein the guide roller combination comprises a first guide roller and a second guide roller, wherein the first guide roller and the second guide roller are coaxially arranged, wherein the first guide roller is provided with a plurality of first guide ribs on one end surface in a proximity of the second guide roller, wherein the plurality of first guide ribs is arranged in a first circular array with a center of one end surface of the first guide roller as a first center, wherein the second guide roller is provided with a plurality of second guide ribs on one end surface in a proximity of the first guide roller, wherein the plurality of second guide ribs is arranged in a second circular array with a center of one end surface of the first guide roller as a second center, and a gap between the plurality of first guide ribs and the second guide ribs forms the inwardly recessive roller groove.

6. The device for adjusting the height of a suspended lamp according to claim 5, wherein the controlling member comprises a controlling disk, a controlling block, and a controlling spring, wherein one end of the controlling block is fixed on an end surface of the controlling disk, wherein a second ring groove is provided in an inward radial direction on a center of an end surface of the second ratchet engaging the first ratchet, wherein the controlling disk is arranged with the second ring groove, wherein the adjusting shell is provided with an operating opening in communication with the first receiving cavity, wherein the other end of the controlling block passes through the first receiving cavity and exits the operating opening, wherein one end of the controlling spring abuts against an inner wall of the first ring groove, and the other end of the controlling spring abuts against one end surface of the second ratchet in a proximity of the first ring groove.

7. The device for adjusting the height of a suspended lamp according to claim 1, wherein the device further comprises a first hook and a second hook, wherein one end of the operating cord is arranged in a hooked fixation with the first hook, and the adjusting shell is connected to the suspended lamp via the second hook.

8. The device for adjusting the height of a suspended lamp according to claim 7, wherein the adjusting shell comprises a lower opening and an upper opening, wherein the lower opening is arranged on a lower end of the adjusting shell, wherein two ends of the operating cord pass through the lower opening, wherein the upper opening is arranged on an upper end of the adjusting shell, and the second hook is arranged at the upper opening.

9. The device for adjusting the height of a suspended lamp according to claim 8, wherein the adjusting shell comprises a first sub-shell, a second sub-shell, and a connecting shaft, wherein the first sub-shell covers the second sub-shell, wherein a gap is formed between an upper portion of the first sub-shell and an upper portion of the second sub-shell, wherein the gap forms the upper opening, wherein the connecting shaft passes through the upper opening between the first sub-shell and the second sub-shell, and the second hook is hooked on the connecting shaft.

\* \* \* \* \*